United States Patent [19]

Bird et al.

[11] 4,152,762
[45] May 1, 1979

[54] ASSOCIATIVE CROSSPOINT PROCESSOR SYSTEM

[75] Inventors: Richard M. Bird; Ju C. Tu, both of Canoga Park, Calif.

[73] Assignee: Operating Systems, Inc., Woodland Hills, Calif.

[21] Appl. No.: 772,935

[22] Filed: Feb. 28, 1977

Related U.S. Application Data

[63] Continuation-in-part of Ser. No. 663,524, Mar. 3, 1976, abandoned.

[51] Int. Cl.² ............... G06F 15/40; G06F 13/00; G11C 15/00
[52] U.S. Cl. ........................................ 364/200; 365/49
[58] Field of Search ... 364/200 MS File, 900 MS File; 365/49

[56] References Cited

U.S. PATENT DOCUMENTS

| | | | |
|---|---|---|---|
| 3,332,069 | 7/1967 | Joseph | 364/900 |
| 3,448,436 | 6/1969 | Machol | 364/900 |
| 3,568,155 | 3/1971 | Abraham et al. | 364/900 |
| 3,643,262 | 2/1972 | Loizides | 364/900 |
| 3,697,951 | 10/1972 | Bartholomew | 365/49 |
| 3,733,589 | 5/1973 | Thompson | 365/49 |
| 3,840,862 | 10/1974 | Ready | 364/200 |
| 3,964,029 | 6/1976 | Babb | 364/900 |
| 4,044,336 | 8/1977 | Babb | 364/900 |

Primary Examiner—Mark E. Nusbaum
Attorney, Agent, or Firm—Victor Sepulveda

[57] ABSTRACT

Herein described is an information retrieval system for identifying and retrieving recorded information from a mass storage system for use in a central processing system. The described system is an associative crosspoint processor system having an input which communicates with and receives stored information from the mass storage system (e.g. magnetic tape, magnetic or optical disk, etc.) upon command from the central processing system. In the system a key momory stores key words which are then compared with data words stored in the mass storage system.

12 Claims, 12 Drawing Figures

ASSOCIATIVE CROSSPOINT PROCESSOR SYSTEM

COPENDING APPLICATIONS

This Application is a continuation in part of copending application, Ser. No. 663,524 filed Mar. 3, 1976, now abandoned, by the same inventors as this application and assigned to the same assignee.

BACKGROUND OF THE INVENTION

This invention relates to electronic digital computer systems and more particularly to a novel and improved associative crosspoint processor system operable on an associative search system.

Retrieving information from mass storage systems can be accomplished either by addressing specific locations in the mass memory or by serially searching each location for a specific content. The latter is usually accomplished by software using conventional hardware which is a software approach to content-addressing, or associativity. The so-called search-by-content method can also be accomplished by a hardware implementation of the associative memory. With this method externally applied information or data, which shall be referred to herein as key words, is compared to certain of the stored data or information in the mass memory. When the key data and stored data match, that stored data and any data associated therewith can then be retrieved.

In the prior art, in a rapid access associative memory, simultaneous comparisons are made bit-by-bit of every word stored in the memory against the contents of an interrogation register. A match signal identifies those words which compare with those words in the interrogation register.

Generally, an information retrieval system of this type is used in conjunction with a general-purpose digital computer which consists of a single central processing unit referred to herein as a CPU. A mass memory such as a magnetic memory disk is used and is capable of storing a very large amount of information for use in the CPU. Such memory disks normally access each track sequentially. Thus, to eliminate the need for supplying addresses to each block of stored data, the associative searching technique is employed.

Heretofore, searching systems have been devised whereby a bit-by-bit comparison of each word is performed by sequentially accessing each track from the disk into a comparison unit where each word on each track is compared bit-by-bit with the search word in a key register associated therewith. Such a system is shown and described in U.S. Pat. No. 3,435,423.

A feature of the present invention is that it improves on these prior art systems by making byte-by-byte comparisons of the information from the mass storage system with the key words in the key memories.

A further feature of the present invention is that it can operate on a variable-length textword base in the associative crosspoint processor as compared to fixed length words in the prior art system.

Yet a further feature of the present invention is that each comparison unit is operable with more than one key word in the associative searching system whereas prior art searching systems are operable on only a single key word.

Still another feature of the present invention is that this sytem is operable in conjunction with computer software available for controlling the associative searching system.

DEFINITIONS

To better describe the preferred embodiment of this invention, the following terms used herein are defined as follows:

A "character" or "byte" is herein defined to consist of eight bits and can therefore take on any value from 000 to 225. For other embodiments, "character" or "byte" need not be restricted to eight bits. "Diskword" or "computerword" is defined to be a 16-bit word, sent from the disk, or bulk memory through the BUS to a peripheral device. A diskword, or more generally, a computer word comprises two 8-bit characters, called bytes. For other embodiments, "diskword" or "computerword" need not be restricted to 16 bits.

"Text word" is defined herein as a string of characters or bytes including natural language words (e.g. the English word "lawyer", "1975", numbers, symbols and patterns) delimited on either end by special characters or ccde bits. These special characters or code bits are called "variable field delimiters".

"Word length" of a text word is herein defined to be the number of characters or bytes between the closest "variable field delimiters".

"Key word" as used herein, is defined to be a whole text word, or the starting 15 characters or bytes thereof, not containing any characters or bit codes called "variable field delimiters."

"BUS" is used herein to denote a plurality of conductors to transmit signals and data from one or many sources to one or many destinations. In another embodiment, the BUS could be replaced by a "channel" or a "daisy chain", terms well-known to those skilled in the arts.

"Variable field delimiter registers" are herein defined to be registers or memory cells to be used for a comparison of their contents with one or more characters or bytes originating from the input buffers. Certain results from this comparison, such as an exact match, determine the end of a previous text word, and the beginning of the next text word.

"Key memories" are herein defined to be a plurality of addressable memories consisting each of a plurality of memory cells, which will all contain key words.

"Pointer memory" is herein defined to be a plurality of addressable memory cells, which contain the starting key memory addresses of the key words.

"Hash memory" is herein defined to be a plurality of addressable memory cells, grouped into 4 consecutive cells, one group for each word length. Each cell contains the location information for one bit (the so-called hash bit), namely, the number of the byte in which it resides, and the number of the bit within said byte. Even though this specification refers only to four such hash bits, it is not confined to four and can be changed or their number can be a specific function of the word length, or some other criterion.

"Extended comparing logic" is herein defined to be one or a plurality of comparing circuits. One or several of these comparing circuits can be enabled by a mask loaded before each search. The enabled comparing circuits will compare the text word simultaneously, byte by byte, to the key words residing at the same address in all key memories.

"Word register" is herein defined to be a shift register containing 16 bytes or more of text words being read in from the input buffers.

"Word length memory" is herein defined to be an addressable, first-in, first-out memory containing a plurality of memory cells, each cell containing the computed word length of the text words shifted into a word register. The contents of the earliest memory cell is transferred into the "word length register" which will thus always contain the word length of the text word which is ready to be shifted out of the word register and be compared to the appropriate keywords in the keymemories.

"Input buffers" are herein defined to be a plurality of first-in, first-out memory buffers, each containing a plurality of memory cells, each cell containing a disk word.

"Output buffers" are herein defined to be a plurality of first-in, first-out memory cells. The output buffer receives one or more computer words of output from the various registers and it stores the oldest output into a register which then can, on command, transmit the contents thereof through the output interface to the central processing unit.

"Text word distance counter" is herein defined as a counter which resets to zero in response to the byte for beginning of the search and which increments by one for each textword shifted out of the word register.

"Load interface" is herein defined to have the following functions: When the central processing unit is processing a loading program, it uses a specific instruction to be able to communicate with the load interface. The load interface then interprets the data sent to it and distributes the data to the variable field delimiter register, to one of a plurality of key memories, to the pointer memory, to the hash memory, or to the extended comparing logic. The load interface is a standard device for a particular host computer. For instance, the load interface and the programming requirements for *Digital Equipment Corporation*, PDP 11, can be found in the Peripheral Handbook for said company describing programming with device registers.

"Search interface" is defined herein to have the following functions: Responding to a specific instruction issued by the central processing unit, the search interface will direct the data subsequently sent over the BUS to one of a plurality of input buffers. The search interface is a standard device for a particular host computer.

"Output interface" is defined herein to have the following functions: Responding to a specific instruction issued by the central processing unit, the output interface makes available to the central processing unit the contents of the output register. The output interface is a standard device for a particular host computer. "BUS isolater interface" is herein described to have the following function: Responding to a specific instruction issued by the central processing unit, it splits the BUS into two functional halves. The bus isolater interface is a specially implemented device which is herein described.

A secondary embodiment of this invention applies the identical techniques described herein to the task of pattern recognition. In order to adequately define this embodiment, as set forth in the claims for this invention, a set of equivalences of terminology can be described as follows:

A "character" or "byte" is equivalent to a "bit".

A "word", a "disk word", "text word", or "computerword" is equivalent to a "bit pattern".

"Variable field delimiter" is equivalent to a "bit pattern string."

Depending on the context, "bit pattern" and "bit pattern string" can be interchangeable. The nuances of this interchangeability are easily understood by those familiar with the art.

BRIEF DESCRIPTION OF THE INVENTION

Briefly described, the present invention is an associative searching system which searches a data input stream of characters or bytes, herein referred to as "text words" or "fields" exhibiting certain relationships with characters referred to herein as "key words". The associative crosspoint processor system of the present invention is a peripheral device communicating with the CPU and contains four interfaces.

A first interface, referred to herein as a "loading interface", loads key words into key memories. As used herein, each key memory is an addressable memory and may contain 1024 (or more) bytes. There may be two to eight (or more) key memories containing all the key words. Each text word byte from the input system into the associative crosspoint processor of this invention is searched in parallel in all key memories, starting at a certain address contained in the pointer memory for as many bytes as the word length indicates.

A pointer memory is loaded from the loading interface with the beginning key word addresses of the key words. As used herein the pointer memory usually contains 256 locations (of ten bit pointer memory words) pointing to the key memories' starting byte of a key word.

Location information of discriminant bits are loaded into a hash memory. A discriminant bit as denoted herein is used in a block of data to define a group of key words of the same word length.

An isolater interface as used herein is shown in FIG. 2. This isolater interface, on command, divides the bus, which is used to couple all the components of this system, and thus isolates the mass storage system from the CPU and couples the mass storage system directly into the associative crosspoint processor system. This, then, cuts the bus traffic from the mass storage system to the CPU and isolates it with the associative crosspoint processor system. The bus isolator itself is a logic controllable bus switch which is a standard device for a particular host computer.

DESCRIPTION OF THE DRAWINGS

These and other features and advantages will become more apparent to those skilled in the art when taken into consideration of the following detailed description wherein like references indicate like or corresponding parts throughout the several views and wherein.

DESCRIPTION OF THE SHOWN EMBODIMENT

Figure 1A:
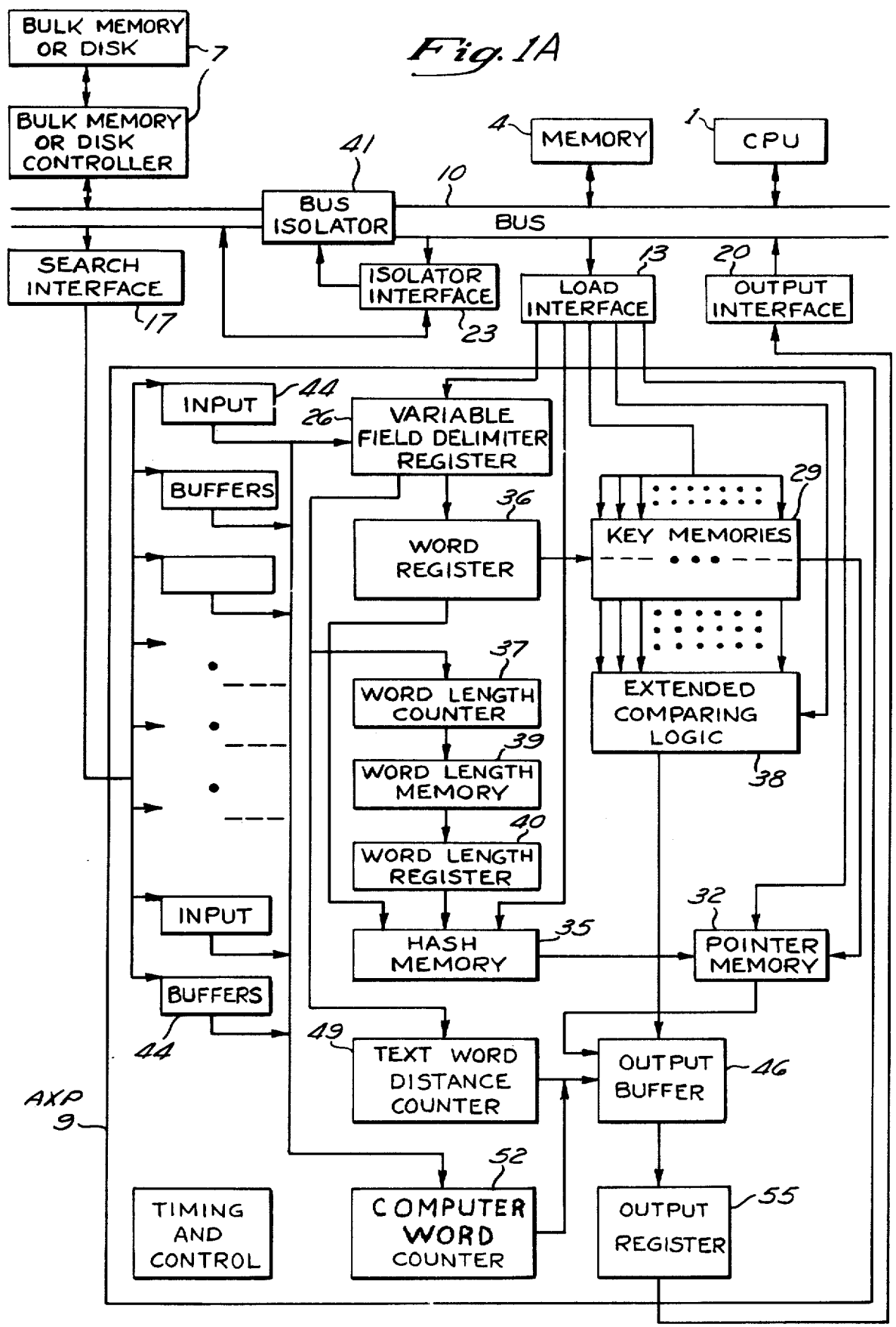
FIG. 1A is a functional block diagram of the associative crosspoint processor system coupled in communication with a central processing unit and a bulk storage system.

Turning now to a more detailed description of one embodiment of this invention, there is shown in FIG. 1A a data processing system with which an, associative crosspoint Processor 9 (AXP) is interfaced as a peripheral device. The data processing system comprises a central processing unit 1 (CPU), a memory device 4, and a bulk memory device (such as a rotating disk) 7, all of which are connected by a cable system (hereinafter called BUS) 10, and the AXP system 9.

As shown in FIG. 1A, the AXP 9 as one of the peripheral devices, is connected to the BUS 10 by means of four interfaces: the load interface 13, the search interface 17, the output interface 20, and the isolater interface 23.

Preparatory to searching the bulk memory or disk 7 for every occurrence of the user-specified key words, the AXP is first loaded by means of commands from the central processing unit 1 hereinafter referred to as CPU 1 through the load interface 13 to variable field delimiter registers 26, to the key memories 29, to the pointer memory 32, to the hash memory 35, and to the extended comparing logic 38.

Figure 3B:
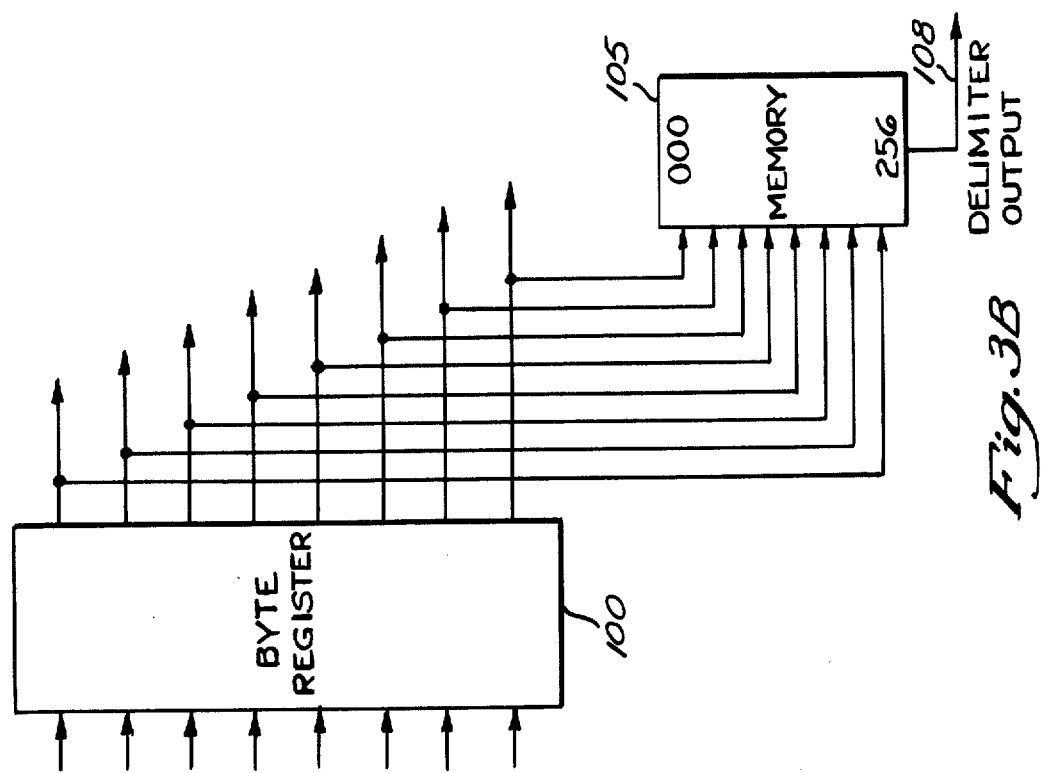
FIGS. 3A, 3B, and 3C are functional block diagrams of systems identifying variable field delimiters as used in connection with the system set forth in FIG. 1A.
Figure 3A:
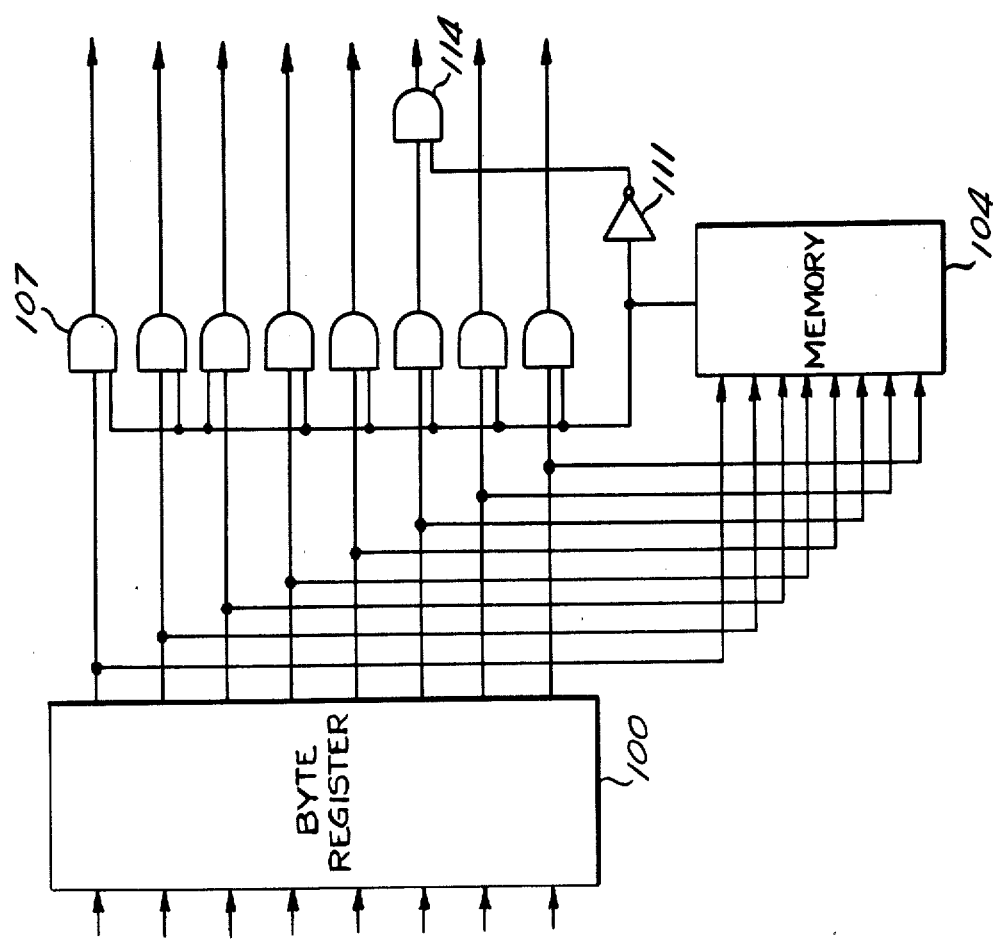
Figure 3C:
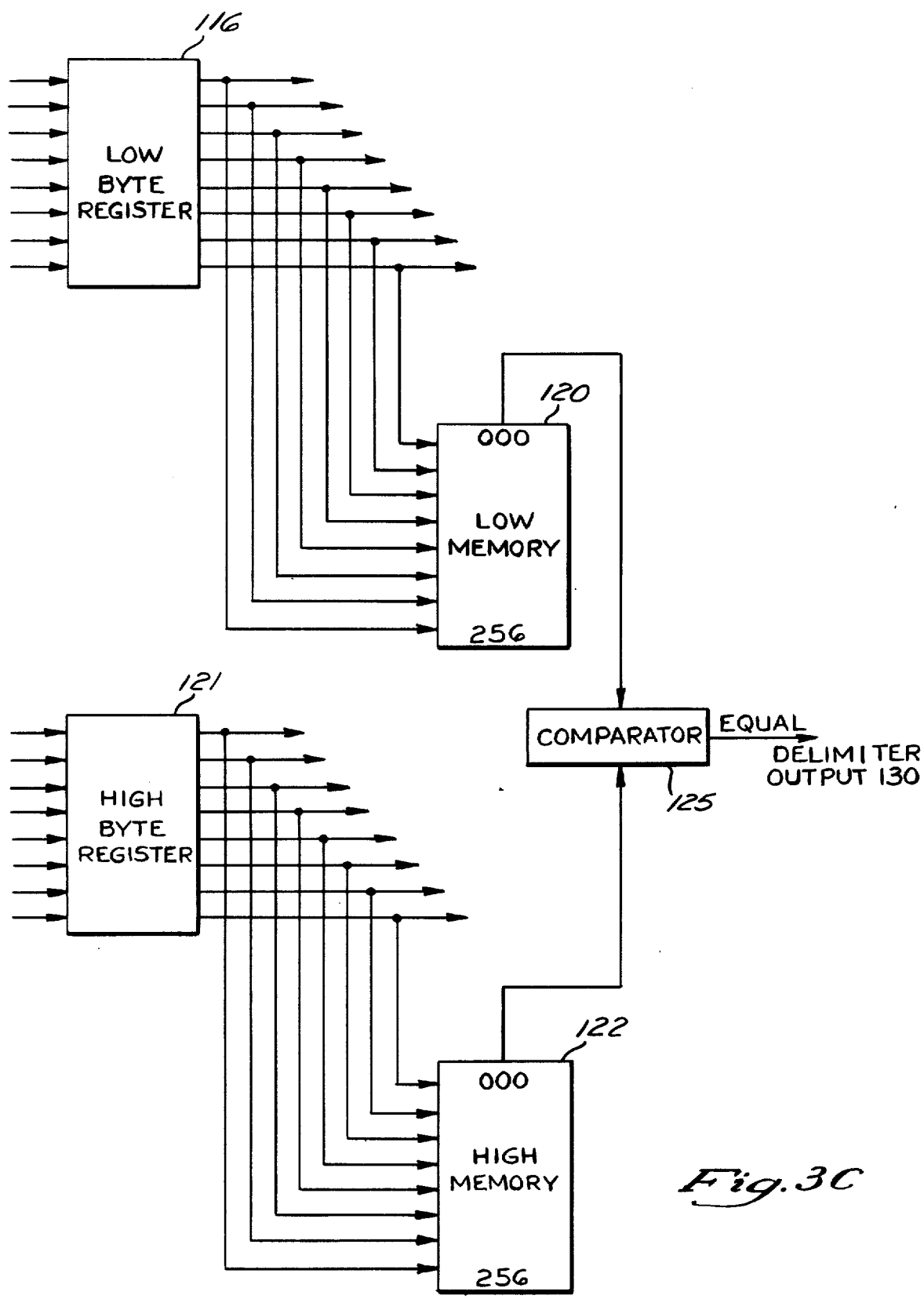

The variable field delimiter registers 26, also shown in more detail in FIGS. 3A, 3B and 3C, are loaded with the binary codes representing the various delimiters of the text words to be searched, such as spaces, punctuation codes, etc.

Figure 1B:
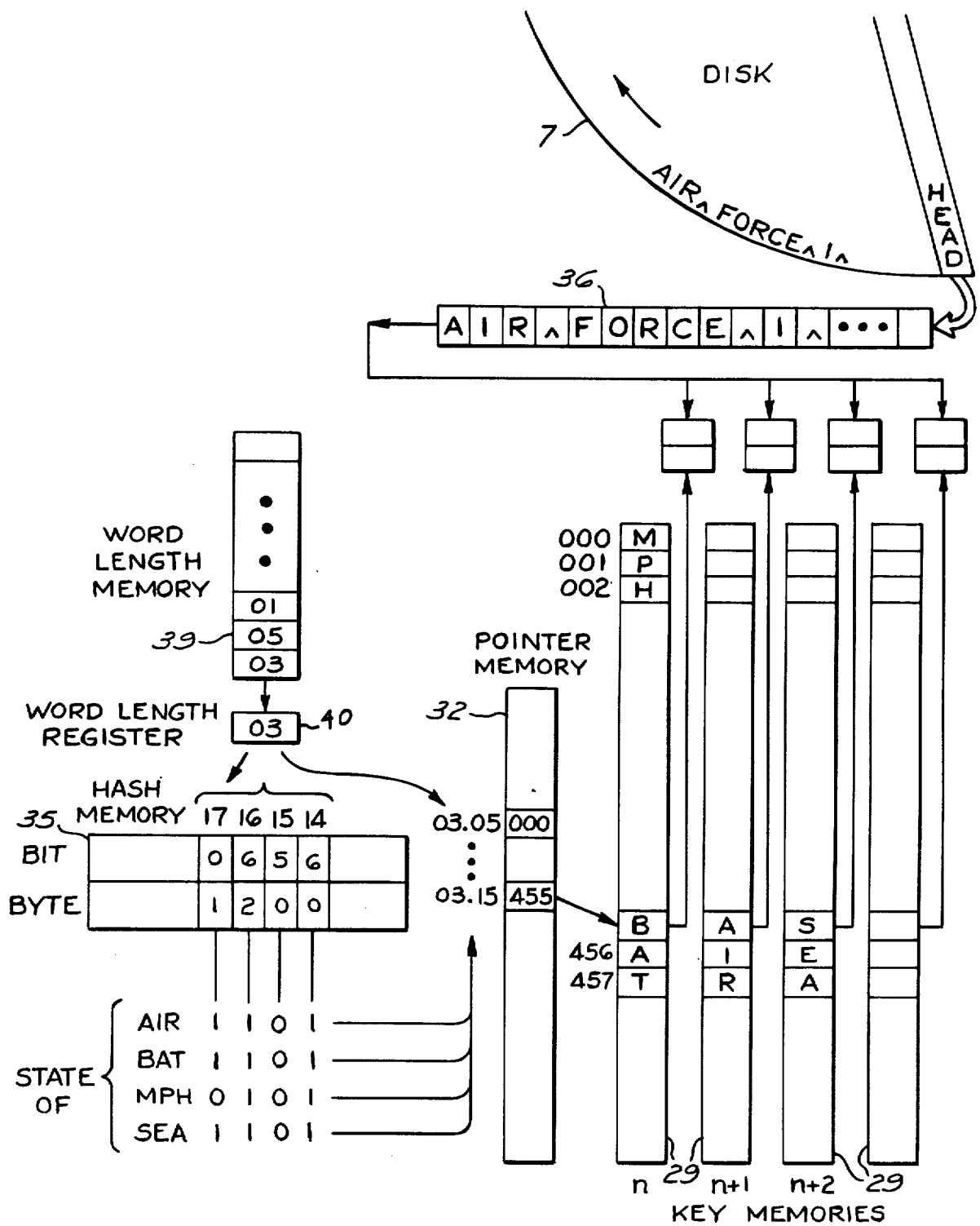
FIG. 1B is a block diagram of FIG. 1A for showing the functions of the associative crosspoint processor system.

One example of an operating embodiment of an AXP is shown in FIG. 1B. Here, the variable field delimiter registers are loaded with the code for a space, which then begins and ends each text word.

The key memories 29 are loaded with the various user-specified key words.

Again referring to FIG. 1B, at addresses 455 through 457, for example, key memory n is loaded with the key word "BAT," while key memory n+1 is loaded with the key word "AIR," for example, and key memory n+2 is loaded with "SEA," for example.

Pointer memory 32 is loaded with the starting key memory addresses of the key words. As shown in FIG. 1B, pointer memory address 03.15 is loaded with the key memory address 455, while pointer memory address 03.05 is loaded with the key memory address 000. The hash memory 35 is loaded with the location of the hash bits for each group of key words of the same word length.

Location 14 of hash memory 35 will receive, for text words of word length 3, the location information for hash bit 1, namely 0.6 (byte 0, bit 6); locations 15 to 17 will be loaded with 0.5, 2.6, and 1.0 respectively. This information was found by the loading software by inspecting the bit positions of all key words of word length 3. The following table shows the octal ASCII code (American Standard Code for Information Interchange, well known to those skilled in the art) for the key words considered:

| byte | 0 | 1 | 2 |
| --- | --- | --- | --- |
| Key Word | | | |
| AIR | 101 | 111 | 122 |
| BAT | 102 | 101 | 124 |
| MPH | 115 | 120 | 110 |
| SEA | 123 | 105 | 101 |

To split up these four key words into several groups (here just two), the loading program decided to designate as hash bit 1 the 6th bit of byte 0, as hash bit 2 the 5th bit of byte 0, as hash bit 3 the 6th bit of byte 2, and as hash bit 4 the 0th bit of byte 1. The state of hash bits 4 to 1 for the three key words AIR, BAT, and SEA will be 1101 (in binary), or 15 (in octal). For this reason, these key words are loaded at the same key word address (e.g. 455), pointed at by the contents of pointer memory 32 at address 03.15. The state of the four hash bits for key word MPH will be 0101 (binary), or 05 (in octal). Thus MPH is loaded at another address of key memory 29 (e.g. 000) which is contained in pointer memory address 03.05.

The extended comparing logic 38 (explained in more detail in connection with FIG. 8) is loaded with the mask for the desired relationships between the key words and fields to be searched on the disk.

Referring to the example shown in FIG. 1B, the extended comparing logic will be loaded with a mask denoting exact match.

Preparatory to searching the bulk memory or disk 7, the BUS isolator 41 has to be enabled to separate the BUS into two halves, so that the data and command traffic from disk 7 to the search interface 17 does not overcrowd the data and command traffic between CPU 1 and memory 4 and between output interface 20 and CPU 1 and/or other traffic from and to CPU 1.

Prior to enabling the BUS isolator 41, CPU 1 commands disk 7 to start reading at the beginning of the data to be searched, it commands the search interface 17 to accept the incoming data, and it then commands the isolator interface 23 to enable the BUS isolator 41.

The search interface 17 is coupled to all input buffers 44; logic circuits thereof direct the disk words to the first free input buffer, filling sequentially all empty buffers. The search interface 17 then attempts to fill the first buffer again, repeating the process until the search is stopped when all input buffers are full or when the AXP 9 recognizes an end-of-collection character. In the former case, the search is suspended until the next input buffer in sequence is freed. Meanwhile, the input buffers are emptied in the same order as they were filled, each disk word being sent to the variable field delimiter register 26. Here, each byte or several adjoining bytes are examined for being a variable field delimiter, such as a blank, a punctuation code, etc. Details of the variable field delimiters are explained in connection with FIG. 5.

When a variable field delimiter has been shifted out of the word register 36, the correct cell in the word length memory 39 will have stored the content thereof into the word length register 40, which now contains the word length of the text word about to be shifted out of the word register 36. The first character of this text word is compared simultaneously across all key memories 29, starting at a certain key memory address. This address is arrived at indirectly, by way of the pointer memory 32. The address into the pointer memory 32 is comprised in part from the word length of the text word to be compared, and in part from four bits (hash bits) located anywhere in that text word. The location information for the four hash bits is found in the hash memory by using as an address the word length contained in word length register 40 where four consecutive locations contain the information in which character and in which bit each hash bit is to be found. It is possible now to compare the text word shifted out of the word register 36, byte by byte, simultaneously across all key memories 29, starting at an initial address found in the pointer memory 32, and ending when the next variable field delimiter is detected.

Referring to FIG. 1B, the text words AIR FORCE 1, for example, are being shifted out of word register 36, the word length memory 39 containing their word length 03, 05, and 01, respectively. The word length register 40 also contains 03, thus referring to the part of hash memory 35 containing the hash bit location information for 3 byte long text words. The four hash bits for AIR are examined and the state thereof found to be 1101, or octal 15. Thus, address 03.15 is generated, 03 representing the word length and 15 representing the state of the hash bits. Thus, location 03.15 in pointer memory 32 is examined, and its contents 455 used as an address. The character A is now shifted out of the word register 36 and compared with all characters at location 455, namely B,A,S, etc., of key memory 29. The I and R are shifted out and compared with the contents of location 456 and 457, respectively, of key memory 29.

Figure 8:
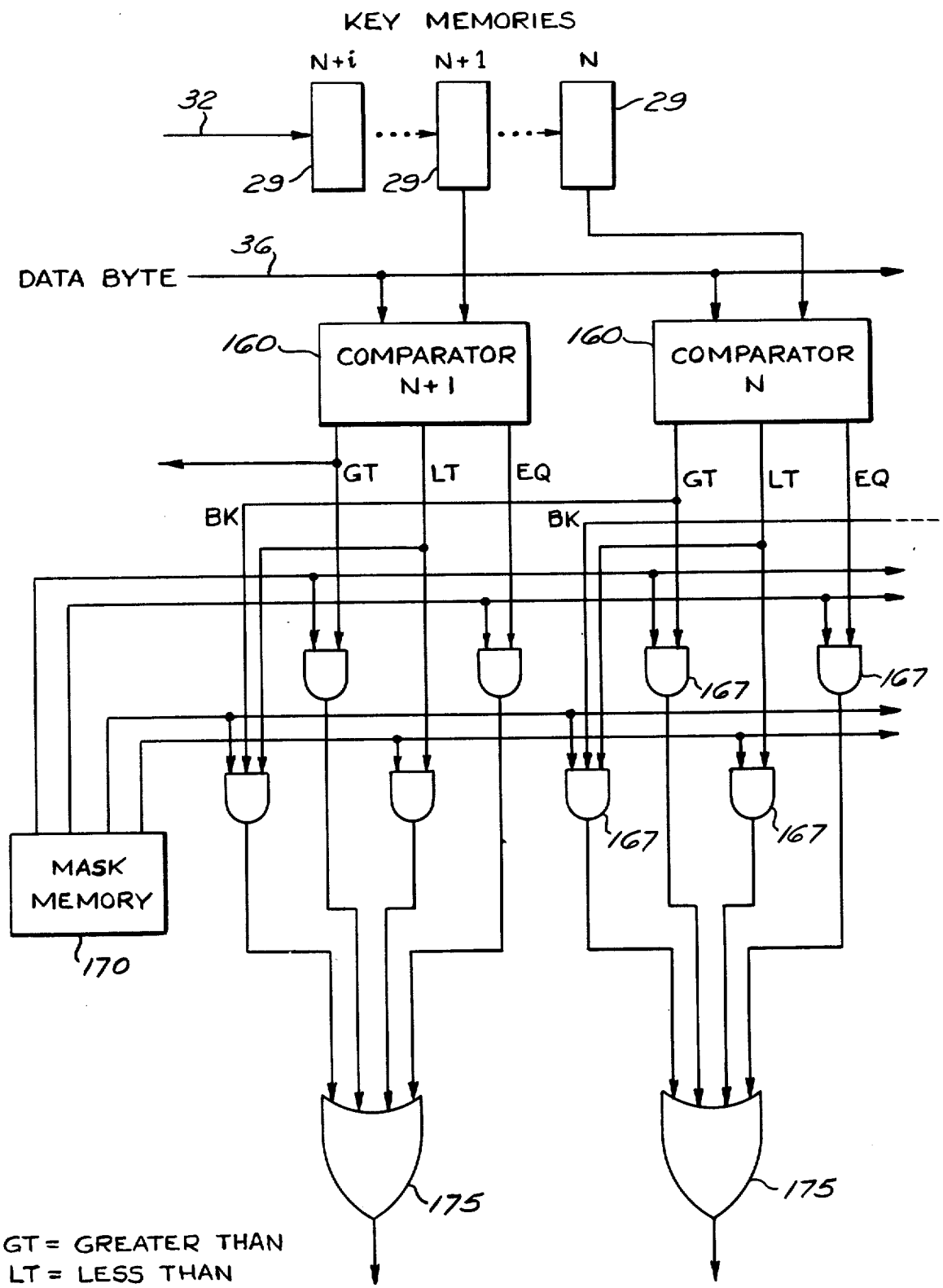
FIG. 8 is a functional block diagram of extended comparing logic useful in connection with the system shown in FIG. 1A.

The extended comparing logic 38, as shown in FIG. 8, will determine from a mask loaded through the load interface 13, which one or ones of the various relationships (equal to key word, less than key word, greater than key word, between limits of keys) are to be used for the comparison.

If the comparison does not hold true, no output is generated. If it is true, the output will consist of two computer words which will be stored into the output buffer 46. The first computer word contains the pointer memory address, pointing to the location of the first character of the key word used, the number of the key memory in which the requested comparison occurred, and the comparison code. This identifies the key word compared. The second computer word contains the contents of the text word distance counter 49. This counter always contains the number of text words input from the disk 7. Text word distance counter 49 is set to zero, when a character code, denoting the beginning of a search, is input.

As shown in FIG. 1B, the key word AIR in the n+1st key memory 29 matches the text word AIR shifted out of the word register 36. The first output word stored into the next available output buffer memory cell will contain the location 03.15 of pointer memory 32, the key memory number n+1, and the code for exact match comparison. The second output word will contain the contents of the text word distance counter 49 at the moment of the match.

A code, denoting the end of a document, also generates an output consisting of two computer words, namely the contents of a computer word counter 52, split into two parts. The disk word counter is a count of the disk words from disk 7 sent to the AXP 9. It is reset to zero only at the beginning of a search command. In another embodiment, where the mass storage location of each successfully compared text word is unimportant, but where an identification of the document in which is was found is required, this document identification is transferred into the output buffers upon recognition of an end-of-document code.

The output register 55 always receives the earliest output stored into the output buffer 46. The output register 55 is emptied through the output interface 20 on command from the CPU 1.

Figure 2:
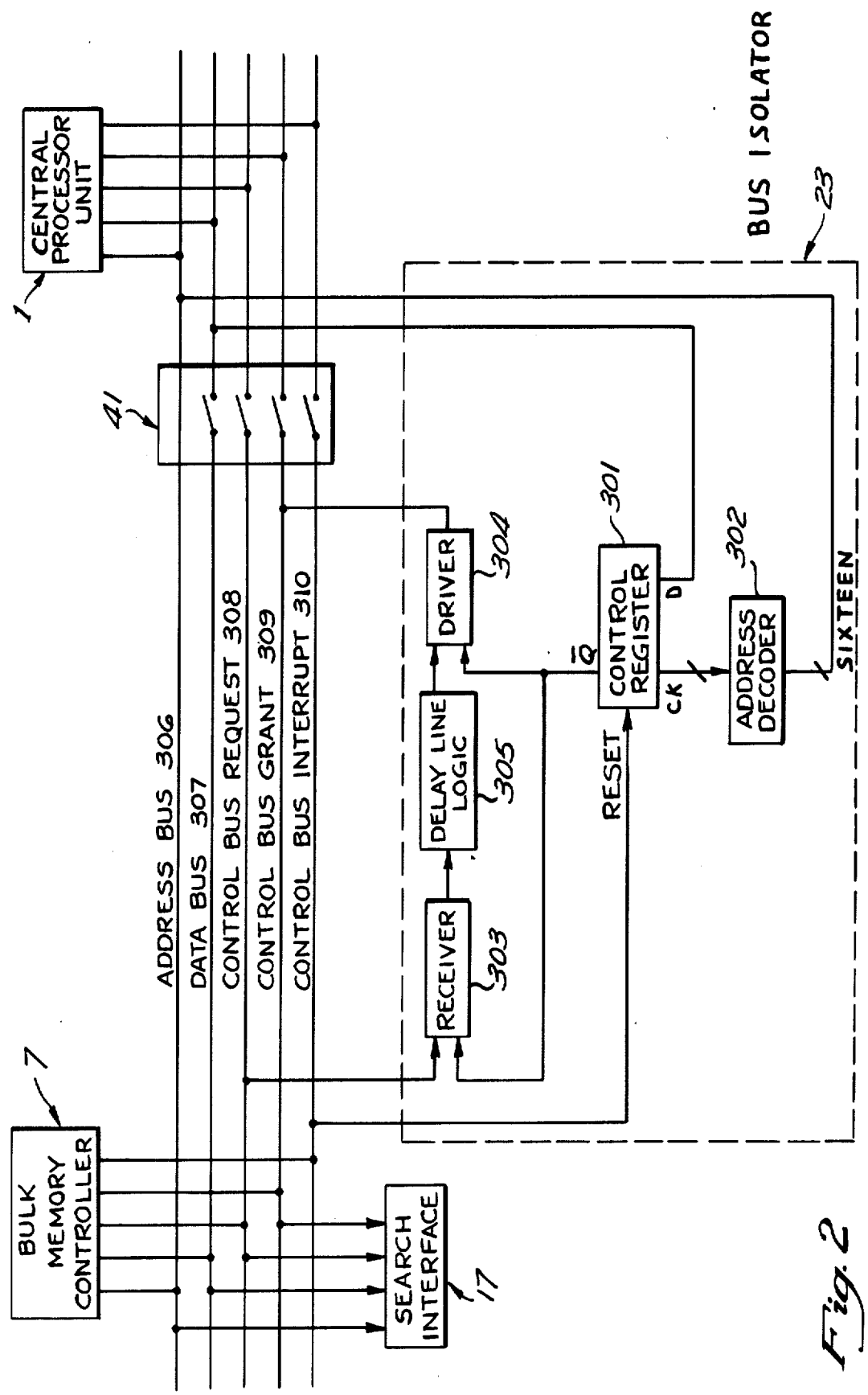
FIG. 2 is a functional block diagram of the bus isolater interface shown in 1A.

Referring now to FIG. 2, there is shown an embodiment of the bus isolater interface circuit 23 which comprises a control register 301 which is coupled to receive a re-set signal from the control bus interrupt line 310 and has an output coupled directly into the address decoder 302. The control register may provide, for example, a $\overline{Q}$ into a receiver 303. The receiver 303 has an output coupled to a driver 304 through a delay line logic 305. The $\overline{Q}$ output from the control register 301 is also coupled into the driver 304. The purpose of the bus isolater interface 23 is to disconnect and reconnect the bulk memory controller 7 and the search interface 17 from and with the bus of the central processor unit 1.

For example, to disconnect a host computer, a bus disconnect command is sent through the bus isolater interface 23 which is characterized by a specific address through an address bus 306 and by a specific data bit through the data bus 307. Upon receiving the bus disconnect command, the output line $\overline{Q}$ of the control register 301 goes to a low state disabling the bus isolater 41 which performs the function of disconnecting the bulk memory control 7 and the search interface 17 from the central processing unit 1. At the same time, the low state of $\overline{Q}$ enables both the receiver 303 and the driver 304 for the purpose as set forth hereinafter.

The bulk memory controller 7, sends one computer word at a time through the search interface 17 but must receive an appropriate response, sometimes referred to as a "hand-shaking" response, before the computer word is actually transferred. When the receiver 303 and driver 304 are enabled in conjunction with the delay line, the "hand-shaking" function is performed. When the bulk memory controller 7 sends a bus request signal through the control bus request line 308, the bus request signal is gated through the receiver 303 into the delay 305. After a specified delay, this signal is then gated through the driver 304 into the controlled bus grant line 309. The resulting signal on the controlled bus grant line 309 then reaches the bulk memory controller 7 to signify to the controller that the transfer to the search interface is to occur, thus activating signals on the data bus, address bus and the control line bus. This procedure is then repeated for each computer word transferred into the search interface 17.

After the search operation transfer transferring data from the bulk memory 7 to the search interface 17 is completed, it then becomes necessary for the bus isolater 41 to reconnect the bus and to disable receiver 303 and driver 304. This is accomplished as set forth hereinafter.

When the search operation is finished, the interrupt signal is generated by the controller 7. This enables the bus isolater 41 and disables the receiver 303 and driver 304 through the control bus interrupt line 310 in the following manner; The interrupt signal from the controller 7 resets the control register 301 and the output signal $\overline{Q}$ returns to the high state. This enables the bus isolater 41 connecting the bulk memory controller 7 and the search interface 17 back to the central processing unit side of the bus while also disabling both the receiver 303 and the driver 304.

FIG. 3A shows one embodiment of a variable field delimiter scheme. Here, each incoming byte is held in a register 100, which is connected to eight AND gates 107. The contents of register 100 is also compared to one of the 256 cells of a 256×1 bit memory 104. The address of this cell is formed by the contents of the byte register 100. The output of memory 104 is gated to all eight AND gates 107, and through inverter 111, to AND gate 114. All cells of memory 104 will be filled with ones, except at the addresses corresponding to codes for delimiters (such as periods, colons, spaces, etc.). For example, if the byte held in register 100 is the code for a colon (octal 072), address 072 of memory 104 will have been loaded with a zero, therefore holding all outputs of AND gates 107 to zeros, except bit 5, thus converting this delimiter to the code for a space (octal 040), which can then be used as the only delimiter code necessary.

FIG. 3B shows a different embodiment of a variable field delimiter scheme. Again, the contents of byte register 100 are used as an address into memory 105, a 256×1 memory device. Memory 105 is filled with zeros, except at addresses corresponding to the codes for field delimiters. The output of memory 105 is thus a 1 for each field delimiter byte, otherwise a zero. For example, at address 040 through 043, corresponding to the codes for space, exclamation point, double quote, and number sign, a one is written into memory 105. Every time one of these field delimiter bytes is loaded into register 100, the delimiter output 108 is held in the logical 1 state.

FIG. 3C shows a different embodiment of a variable field delimiter scheme which comprises a low byte register 116 operable in connection with a low byte memory 120 and a high byte register 121 operable in connection with high byte memory 122, whereby any combination of specific adjacent bytes (a low byte and a high byte) are considered a field delimiter. To each combination of such 2-byte field delimiters is assigned a code from 1 to 14. This code is written into low memory 120 (at the outset initialized to all zeros) at the address formed by the value of this low byte, and also into high memory 122 (at the outset initialized to all ones) at the address formed by the value of this high byte. The outputs of both memories 120 and 122 are fed into a comparator 125. On an equal comparison, delimiter output 130 is held high, denoting that a field delimiter has been input.

If, for example, only the two combinations "period" followed by "space", and "period" followed by the code for "line-feed" are to be considered field delimiters, a code of, say 3 will be written into octal address 056 in low memory and into octal addresses 404 and 012 in high memory. (056 is the code for "line-feed".) Thus, an equal comparison at delimiter output 130 can only result from one of the two desired combinations.

This embodiment requires two memories, each with 256 addresses of 4 bits each. To enlarge the capacity to more than 14 different pairs of delimiter bytes, both memories and comparator sizes could be increased.

Figure 4:
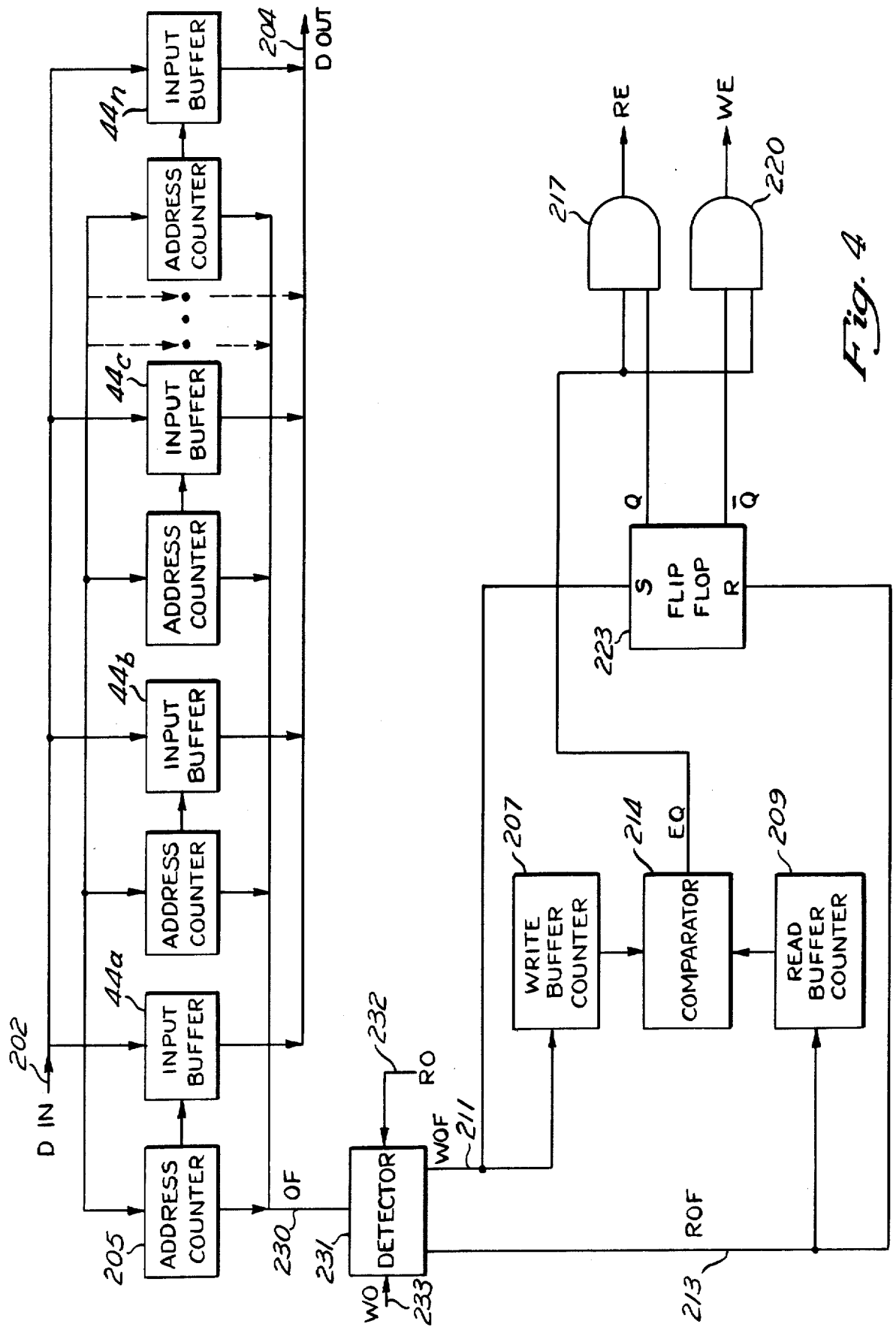
FIG. 4 is a functional block diagram of the input buffering scheme used in connection with the system set forth in FIG. 1A.

FIG. 4 depicts one embodiment of the input buffering scheme. The input buffers 44a through 44n are connected in parallel to the data-in lines 202 (DIN) to accept (write) data from the disk 7. Similarly, said input buffers are connected in parallel to the data-out lines 204 (DOUT) to read data into the variable field delimiter registers 26. Each input buffer has an associated address counter 205 directing the data to or from the address indicated by the contents of counter 205.

Since the purpose of this buffering scheme is to accept data from the disk 7 at the fixed rate dictated by the disk speed, while unloading it to the AXP 9 asynchronously, it is not permitted to read and write from the same input buffer. Two buffer counters are provided: a write buffer counter 207, and a read buffer counter 209. The overflow line 230 (OF), connected to all address counters 205, is coupled to detector 231, which is controlled by write phase clock 233 (WO) and read phase clock 232 (RO). An overflow out of any address counter 205, when writing, will cause therefore a write overflow output WOF on line 211. An overflow out of any address counter 205, when reading, will cause a read overflow output ROF on line 213. Set to zero at the beginning of the search, write buffer counter 207 is incremented by one in response to each signal on write overflow line 211 (WOF). Similarly, read buffer counter 209 is incremented by read overflow signals. Comparator 214 compares the contents of read buffer counter 209 with the contents of the write buffer counter 207 and, on an equal comparison sends a signal to AND gates 217 and 220. A write overflow signal on line 211 also sets a flip-flop 223 so that its true output Q, ANDed with an equal comparison from comparator 214, results in the read-enable signal RE from AND gate 217, enabling the input buffer denoted by the contents of read buffer counter 209 only to be read, not to be written.

On the other hand, a read overflow signal on line 213 resets flip-flop 223, so that its false output $\overline{Q}$, ANDed with an equal comparison signal from comparator 214, results in a write-enable signal WE from AND gate 220, enabling the input buffer denoted by the contents of the write buffer counter 207, only to be written, not to be read. This condition also holds at the beginning of the search, since flip-flop 223 is then initially reset, allowing the first input buffer 44a to be written into.

Figure 5:
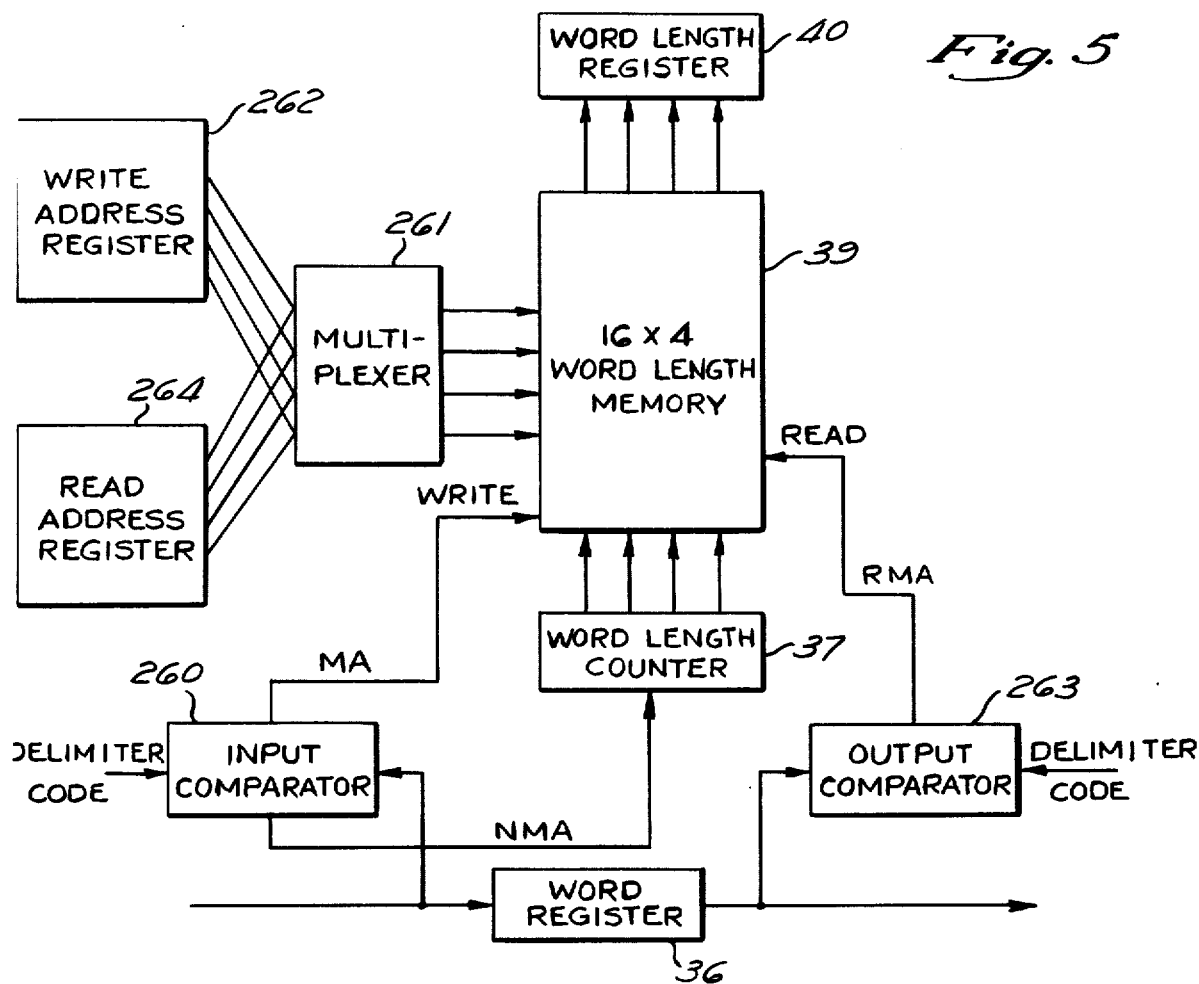
FIG. 5 is a functional block diagram of the word length memory used in connection with the system set forth in FIG. 1A.

FIG. 5 shows an embodiment of the word length memory where each byte shifted into word register 36 is also directed to the input comparator 260. A second input into input comparator 260 contains the code from a variable field delimiter, such as a code for a space. If no matching condition exists, line NMA increments the contents of word length counter 37 by one. A matching condition supplies, through line MA a write pulse to the word length memory 39, which thus accepts the contents (i.e., the word length of the previous text word) of the word length counter 37. Multiplexer 261 is at this time, connected to the write address register 262, containing the write address initially set to zero at the start of the search. At this time the write address register will be incremented by one.

Each byte shifted out of word register 36 is also compared in output comparator 263 to the variable field delimiter code. On an equal comparison, line RMA is connected to the READ input to the word length memory 39, using the contents of read address register 264 through multiplexer 261 as an address, and reading the contents of the address into word length register 40. At this time, the read address register 264 will be incremented by one.

Figure 6:
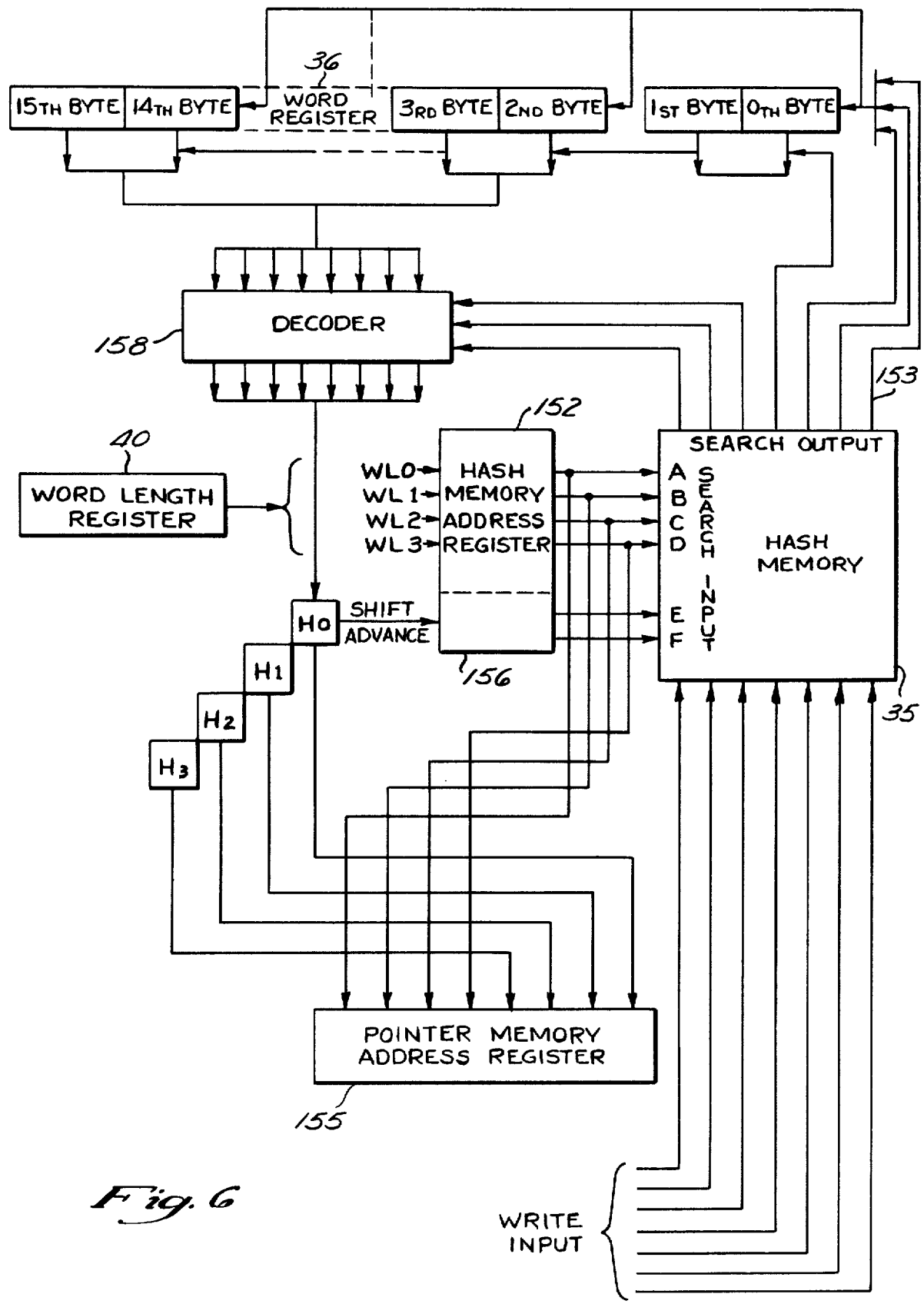
FIG. 6 is a functional block diagram of the hash memory used in connection with the system shown in FIG. 1A.

FIG. 6 refers to one embodiment of the hash memory 35 and the system operable therewith. Through the load interface 13, the hash memory 35 is filled sequentially from the address 000 to the highest address with the computed hash memory codes.

During a search operation, hash memory address register 152 is loaded with the word length WL0 to WL3 from word length register 40, while the least significant two address bits are supplied from shift advance counter 156, initialized to zero. The resulting six address lines ABCDEF determine a hash memory cell, whose contents are available on the search output lines 153. The three most significant bits determine, in word register 36, the byte pair, the next significant bit, the even or odd byte of said pair, and the three least significant bits through decoder 158 determine the bit of said byte. The state of said bit (the so-called hash bit) produces bit H0 in pointer memory address register 155. A shift advance pulse into the shift advance counter 156 associated with the hash memory address register 152 advances the address into the hash memory 35 and produces (through the same logic) bit H1; and further shift advances produce bits H2 and H3. The remaining 4 bits of pointer memory address register 155 are supplied by the word length lines ABCD.

Figure 7:
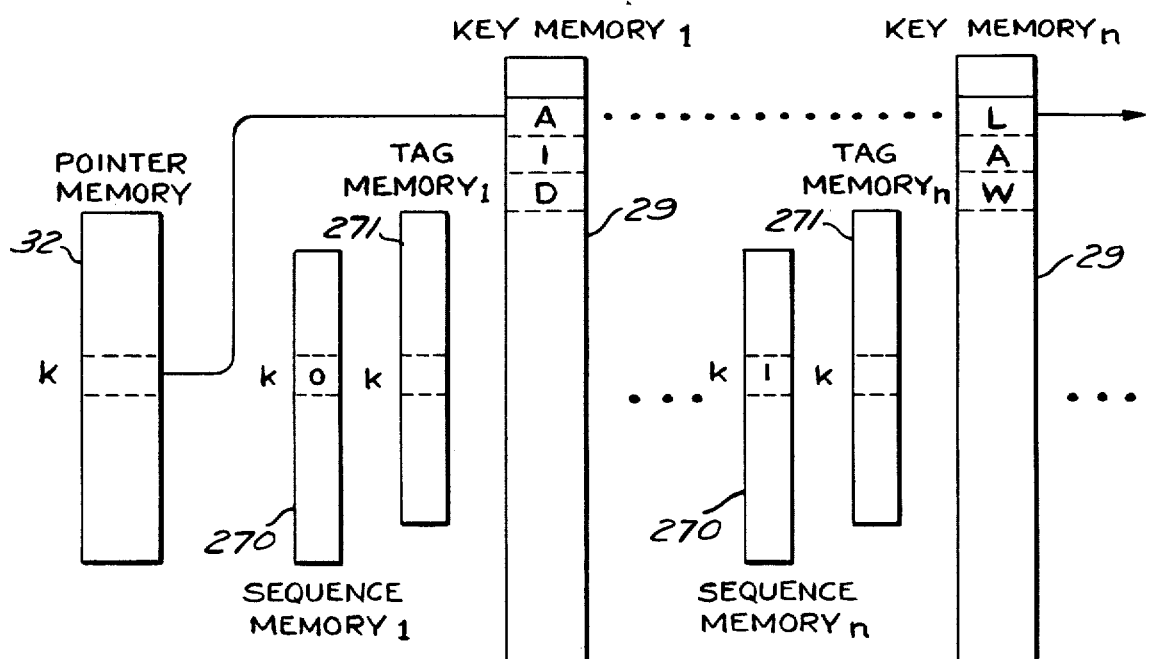
FIG. 7 is a functional block diagram of an alternate embodiment of the key memories.

FIG. 7 shows a further embodiment of the key memories 29, having associated sequence memories 270 and tag memories 271, which permit the AXP 9 to make a distinction between single key words $SW_1$, $SW_2$, $SW_3$, (such as the word "LAWYER", "AID", "POSTPONEMENT", etc.) and multiple key words $MW_{i1}$, $MW_{i2}$, $MW_{i3}$,... $MW_{m1}$, $MW_{m2}$, (such as words "SUPREME COURT JUSTICE", or "PATENT LAW").

With each key memory n, there is associated a sequence memory n and a tag memory n, so that for each cell in pointer memory 32 there is a corresponding 1-bit cell in each sequence memory and tag memory.

At the time of loading the AXP 9, the sequence memories 270 and tag memories 271 are initialized with zeros, and the sequence memories 270 are loaded with a zero or a one depending on the following conditions: For each single key word $SW_n$ loaded into key memory i at an address found in pointer memory cell k, a zero will be loaded into corresponding cell k of sequence memory i, (e.g. key word "AID"). For each key word which is part of a multiple key word $MN_{n1}$, $MW_{n2}$, etc., loaded into key memory n at an address found in pointer memory cell k, a one will be loaded into the corresponding cell k of sequence memory n (e.g. key word "LAW").

At the time of searching the AXP 9, when the required comparison between key word and text word has been found, a one is written into cell k of the tag memory associated with the key memory compared. However, an output of two computer words is produced only if sequence memory cell k is a one, or if sequence memory k is a zero, while tag memory cell k had previously been a zero. When an end-of-document character is found, the tag memory 271 is cleared to zero.

Thus, outputs are only generated when multiple key words are successfully compared, or when single key words are successfully compared for the first time in a document.

This allows the software to make any sophisticated analysis of logical connections between multiple key words.

FIG. 8 shows an embodiment of the extended comparing logic. For each of a plurality of cells in key memory 29 there is an associated comparator 160. Each comparator simultaneously receives one byte of information from its associated key memory 29 at the address initially read out from pointer memory 32. All comparators receive, as a second input, the data byte shifted out of the word register 36.

The output of each comparator 160 comprises three lines EQ for "equal" comparison, LT for "less than" comparison, and GT for "greater than" comparison, each serving as an input to an AND gate 167. Each N+1 comparator also has associated a fourth AND gate which is connected to its LT line and, in addition, is connected to the GT line of comparator N, thus indicating a BK comparison (between keys). A further input into every AND gate 167 originates from a mask memory 170 which is loaded with a mask at load time. The mask indicates the desired type of comparison or comparisons. The outputs of each group of four AND gates 167 are used as inputs to an OR gate 175. The output of said OR gate keeps a latch set until a mismatch occurs in which case the latch will stay reset until a new text word is recognized. When a variable field delimiter is recognized before being shifted out of word register 36, this latch, when set, will cause an output of two computer words into the output buffer.

For example, if the comparison required at the outset of the search is decided to be a "less than or equal" comparison, the mask memory 170 is loaded in such a way that all AND gates 167 fed by the LT and the EQ lines are enabled. Thus, if the data byte compares "lower" than a particular byte of a key word, the output of the LT AND gate is a one, and, in turn, the output of the OR gate 175 is a one. If the latch is set, it will stay set. (i.e., matched) If it was reset (i.e., indicating an unmatched condition), it will stay unmatched.

Another feature of the extended logic not shown in FIG. 8 is the recognition of a "don't care" comparison: Each byte read out of each key memory 29 into comparators 160 is first compared to a special byte which denotes a "don't care" condition.

If it is not such a byte, the comparison with the data byte occurs in comparator 160 as described above.

If the key memory byte is found to be a "don't care" byte, the output of OR gate 175 is inhibited, thus keeping the latch unchanged (set or reset). Thus a "don't care" byte in any key memory will bypass the comparison in the comparators 160 and will cause any data byte in this position in a text word to be considered successfully compared.

Figure 9:
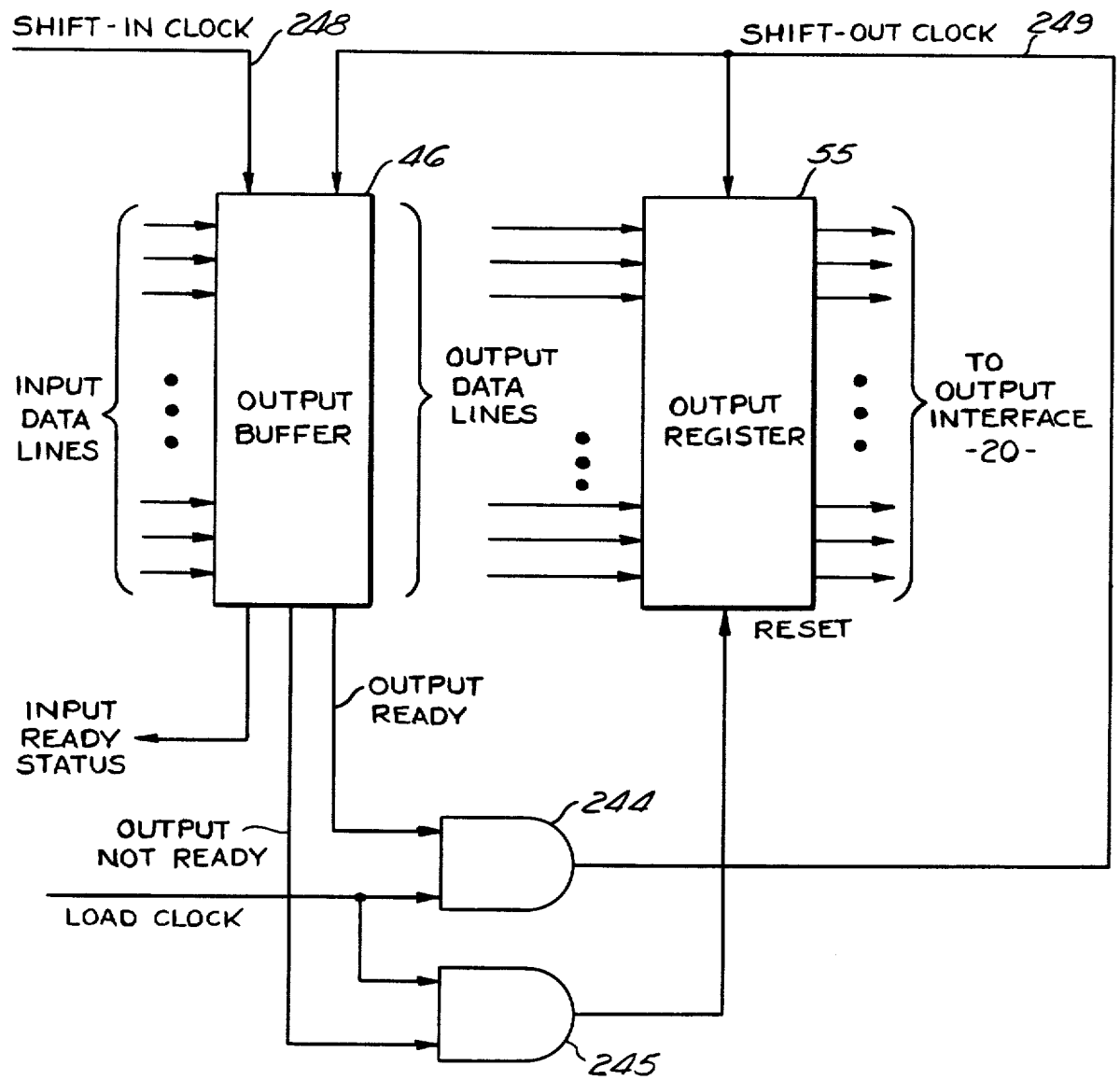
FIG. 9 is a functional block diagram of the output buffering scheme used in connection with the system set forth in FIG. 1A.

FIG. 9 shows an embodiment of the output buffering scheme where the data coming from various sources is clocked into output buffer 46 with the shift-in clock pulse 248 and is shifted out into the output register 55 with the shift-out clock pulse 249. The latter is the output of AND gate 244, the inputs of which are the output ready signal and a load clock pulse. Output register 55 is reset from AND gate 245, thereby indicating that no output is available. This AND gate 245 has as inputs the same load clock pulse and the "output-not-ready" signal.

Referring back to FIGS. 1A through 9, in the foregoing discussion, the further embodiment of the invention as a device for pattern recognition simply requires the exchange of equivalent terms as defined previously. Those skilled in the art will have no problem making these transitions in reviewing the foregoing descriptions.

Having thus described only preferred embodiments of the invention, what is claimed is:

1. An associative searching system for searching a data input stream of text words for the occurrence of selected key words of interest, each text word including at least one character; comprising a plurality of key memories addressable in parallel for containing key words at predetermined positions;

a word register means for receiving each text word of the data input stream;

means for simultaneously comparing each text word one character at a time with the key words at a selected key memory address in all said plurality of addressable key memories;

a word length register coupled to said word register means for determining and storing information indicative of the number of characters of each text word stored in said word register means; and an address generating means for generating said selected key memory address for each input text word from said word register means to indicate the address of key memories to insure comparison of each text word with key words of an identifiable likeness with respect to certain characters, said address generating means including further memory means containing certain predetermined information therein for indicating which certain bits are to be segregated from other bits by specific bit location in said text words, and said memory means being addressable by the total number of characters therein, and said address generating means including logic means responsive to said word length register for segregating bits from each text word in accordance with said further memory means to determine the key memory address corresponding to that text word.

2. The searching system as defined in claim 1 and wherein said further memory means of said address generating means includes a word length memory adapted to generate a first predetermined number of pointer memory address bits;

a hash memory adapted to generate a further predetermined number of pointer memory address bits, said total predetermined number of pointer memory address bits being an address for a pointer memory; and a pointer memory adapted to receive said address bits generated by said word length memory and said hash memory for providing a starting address for said key memories.

3. In an associative searching system which includes means for receiving a stream of input digital text words containing various numbers of text characters each coded as a group of bits; the combination of a plurality of key memory means for storing selected key text words of interest, said key memory means being addressable in parallel so that each address accesses a plurality of stored key text words, the key text words stored at the same address in respective key memory means being all of the same word length and having characteristics in common comprising a pattern of bit states which is distinctive for that word length and corresponds to that address;

hash memory means for storing predetermined information related to said characteristics, word length counter means for counting the number of characters in each input text word, decoder means for addressing the hash memory means and responsive to the output of the hash memory means, to said counter means and to said input stream of text words for developing a digital representation of the bit state pattern that is distinctive of each text word, access means responsive to said digital representation for generating the key memory address corresponding thereto, comparing logic means coupled to said input stream and to the respective key memory means for comparing each input text word simultaneously with each of the key text words at said generated key memory address in the respective key memory means, and output means responsive to said comparing logic means for reporting a true comparison if a match has occurred.

4. In a pattern searching system which includes means for receiving a stream of input data patterns to be searched for selected key patterns of interest, said patterns comprising various numbers of groups of bits; the combination of a plurality of key memory means for storing said key patterns, said key memory means being addressable in parallel so that each address accesses a plurality of stored key patterns, the key patterns stored at the same address in any of the key memory means having in common a predetermined distinctive characteristic corresponding to that address, which characteristics are derivable by predetermined processing of the patterns, decoder means responsive to said input stream of data patterns and containing predetermined information relating said input data patterns to said characteristics for processing an input data pattern to develop a digital representation of the characteristic that is distinctive of that pattern, access means responsive to said digital representation for generating the key memory address corresponding thereto, pointer memory means used by said access means and being addressable by the output of said decoder means for storing the initial addresses of pattern groups of bits in the key memory means, a plurality of comparing logic means coupled to said input stream and to the respective key memory means for comparing said input data pattern simultaneously with each of the key patterns stored at said generated key memory address in the respective key memory means, and output means responsive to said comparing logic means for reporting a true comparison if a match has occurred.

5. The pattern searching system as defined in claim 4, said decoder means including hash memory means containing certain predetermined information for identifying certain bits in said data input stream for segregation from other bits by specific location, said certain bits to be used for generating a key memory address.

6. Pattern searching system according to claim 4 wherein said distinctive characteristic corresponding to each key memory address comprises the number of groups of bits contained in each of the key patterns stored at that address, and said decoder means comprises means for counting the number of groups of bits in an input data pattern and developing a digital representation of such number.

7. Pattern searching system according to claim 4 wherein said distinctive characteristic corresponding to each key memory address comprises a distinctive configuration of the bits at a selected plurality of bit locations in each of the key patterns stored at that address, and said decoder means includes means for extracting from an input data pattern the bits at said selected bit locations and developing a digital representation of the configuration of said extracted bits.

8. Pattern searching system according to claim 4 wherein said distinctive characteristic corresponding to each key memory address is derivable from the number of groups of bits and the values of the bits at a plurality of selected bit positions in each of the key patterns stored at that address, and said decoder means includes means for counting the number of groups of bits in an input data pattern,
means for extracting from said input data pattern the bits at said selected bit positions,
and logic means responsive to the respective outputs from said counting means and said extracting means for deriving a digital representation of the corresponding said distinctive characteristic.

9. Pattern searching system according to claim 8 wherein said selected bit positions are differently selected for patterns containing certain different numbers of groups of bits, and said decoder means includes hash memory means for storing the selected bit positions for such numbers of groups.

10. Pattern searching system according to claim 4 wherein said stream of input data patterns is received from a mass storage system adapted to store said data patterns as computer words all containing the same number of bits; said output means comprising first counter means for maintaining a running count of data patterns in said input stream,
second counter means for maintaining a running count of computer words in said input stream, and
output buffer means for storing in response to each true comparison the associated key memory address, the associated count in said first counter means and the associated count in said second counter means.

11. Pattern searching system according to claim 4 wherein said key memory means are adapted to store key patterns which comprise digital text words containing various numbers of text characters, said input data patterns comprise such text words, and said groups of bits represent text characters.

12. An associative searching system having inputs from a mass storage system to a searching system under the initial control of a host computer central processing unit, the mass storage system being adapted to store text words comprising text characters, coded by a group of bits, said searching system comprising word register means coupled to said mass storage means for receiving each stored text word,
a plurality of key memory means for storing key words at predetermined positions, said key words comprising groups of text characters coded by groups of bits and being selected anticipated text words of interest,
pointer memory means for storing predetermined addresses of key words stored in said plurality of key memory means,
word length counter means coupled to said word register means for counting the number of characters in each text word,
word length memory means coupled to said word length counter means for storing the number of characters determined by the word length counter means, said number of characters comprising a first portion of the address for said pointer memory means,
hash memory means for storing predetermined information used for selecting bits in predetermined bit positions for the incoming text words,
access logic means for coupling the output of said word length memory means to address said hash memory means,
decoder logic means for accessing the predetermined information from said hash memory means and for providing an output of the selected bits from the predetermined bit positions in the text word, the states of said selected bits providing a second portion of the address for said pointer memory means,
means responsive to said first and second address portions for addressing said pointer memory means,
an addressing logic means coupled to the output of said pointer memory means and to said key memory means for addressing certain key words by the key memory address stored in the said pointer memory means,
a plurality of comparing logic means coupled to the output of said word register means and to the output of said plurality of key memory means and including logic for the simultaneous comparison of the text word and the key words addressed by said addressing logic means on a character by character sequential basis to detect if a match has occurred between the text word and one of the addressed key words,
output buffer means responsive to said comparing means for recording the address of the matched key word in the key memory means, and
means coupled to said output buffer means for transferring to the central processing unit of the host computer the address of the matched key word.

* * * * *